Aug. 22, 1939.    L. J. ELLISON    2,170,634
SULPHIDE RECTIFIER
Filed April 3, 1937
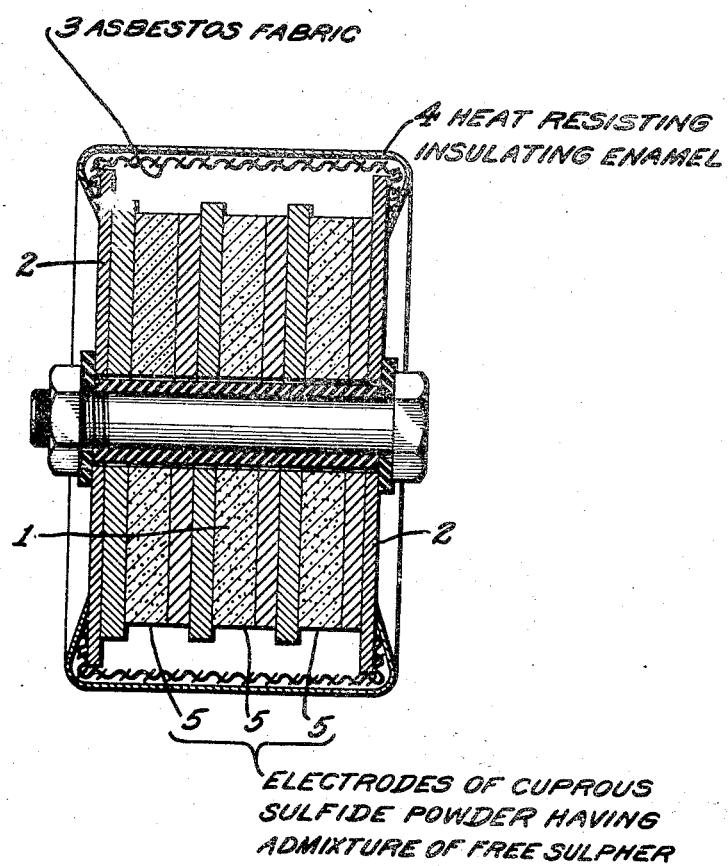
INVENTOR
LESLIE JAMES ELLISON.
BY
ATTORNEY Patented Aug. 22, 1939

2,170,634

UNITED STATES PATENT OFFICE 2,170,634

SULPHIDE RECTIFIER

Leslie James Ellison, London, England, assignor to International Standard Electric Corporation, New York, N. Y.

Application April 3, 1937, Serial No. 134,899
In Great Britain June 5, 1936

3 Claims. (Cl. 175—366)

This invention relates to dry contact metal rectifiers of the kind having one electrode of a metal sulphide, for example cuprous sulphide.

Such rectifiers develop a considerable heat during operation and there is thus danger that the sulphide may in places be converted into the metal. In the case of cuprous sulphide, this may be converted into cupric sulphide, cuprous oxide, and finally copper dendrites which form in the active face with free copper at the outer surfaces, thus causing short circuits and burn outs which terminate the rectifying effect.

I have found that these imperfections may be prevented by the preservation of a sulphur containing atmosphere surrounding the rectifier. To this end free sulphur is mixed with the sulphide powder which is compressed to form one electrode of the rectifier, and the rectifier is totally enclosed so as to retain a constant atmosphere containing sulphur at the active faces. I find 7% of free sulphur to be a satisfactory proportion in the case of a cuprous sulphide rectifier.

Rectifiers of the kind to which this invention relates are frequently covered with lacquer in order to exclude moisture but this has been found to be unsatisfactory. Although a constant atmosphere is thereby preserved at the active faces of the rectifier and moisture is excluded, the conversion of cuprous sulphide into copper dendrites is not thereby prevented in the absence of free sulphur from this atmosphere.

Moreover, the electrode of cuprous sulphide is porous to a high degree and thus some of the medium in which the lacquer is dissolved or suspended for the purpose of applying it is absorbed by the electrode. During the working of the rectifier the heat generated is apt to char the absorbed medium producing a carbon deposit and thus leading to short circuits within the rectifier.

I therefore place the rectifier between two thin copper washers of slightly greater diameter than that of the electrodes and lap the external rim thus provided with an asbestos wrapping. The wrapping is then coated with one or two applications of varnish, enamel or paint, which must be heat resisting and electrically insulating. A suitable coating comprises an undercoat of glyptal base synthetic pigmented stoving enamel, and an upper coat of clear glyptal base stoving enamel. The asbestos wrapping prevents absorption of the varnish, enamel or paint and withstands the heat of operation of the rectifier.

The annexed drawing represents a sectional elevation of one embodiment of my invention. As indicated in the single figure of drawing a rectifier 1, of the kind whose individual couples each include an electrode 5 of cuprous sulphide, has incorporated in each sulphide electrode 5 an admixture of free sulphur. A thin copper washer 2 is disposed at each end of the rectifier 1; and a tape of asbestos fabric 3 is lapped around the external rim thus formed. A sealing coating 4 of a glyptal-base heat-resisting insulating enamel is then applied to the fabric cover 3 to retain the sulphur-bearing atmosphere around the rectifier. The asbestos fabric 3 serves as a base for this sealing coating 4 of enamel and keeps such enamel from being absorbed into the porous cuprous sulphide electrodes of the rectifier 1.

The stability and life of the rectifier are thus improved by the protection of the active faces of the rectifier from varying conditions of atmosphere and moisture and the retention of a constant, free sulphur containing atmosphere.

What is claimed is:

1. A dry contact metal rectifier of the sulphide type having an electrode formed of a powdered sulphide mixed with free sulphur, and a heat resisting impervious cover comprising an asbestos fabric coated with a heat resisting and electrically insulating enamel, paint or varnish.

2. A rectifier as claimed in claim 1, wherein said electrically insulating enamel, paint or varnish has a glyptal base.

3. A rectifier as claimed in claim 1, wherein the free sulphur admixed in said electrode is present in the proportion of about 7%.

LESLIE JAMES ELLISON.